United States Patent [19]

Rutz et al.

[11] 3,835,415
[45] Sept. 10, 1974

[54] HIGH RADIANCE SEMICONDUCTOR LASER
[75] Inventors: Elizabeth Maria Rutz, Bethesda; Morton Richard Kagan, Potomac, both of Md.
[73] Assignee: International Business Machines Corporation, Armonk, N.Y.
[22] Filed: June 28, 1972
[21] Appl. No.: 266,904

[52] U.S. Cl......... 331/94.5 S, 250/203 R, 356/152, 331/94.5 C
[51] Int. Cl. ............................................. H01s 3/00
[58] Field of Search ........... 331/94.5; 356/152, 172; 250/201, 202, 203

[56] References Cited
UNITED STATES PATENTS 3,240,941  3/1966  Zuckerbraun.................. 250/203 R
3,395,365  7/1968  Fork ................................ 331/94.5

OTHER PUBLICATIONS

Rutz et al., "Diffraction–Limited GaAs Laser with External Reflector" Applied Optics, Vol. 8, pp. 1,859–1,865, Sept., 1969.

Primary Examiner—Edward S. Bauer
Attorney, Agent, or Firm—Thomas F. Galvin; John E. Hoel

[57] ABSTRACT

A diffraction-limited semiconductor laser system capable of a high radiance output which features means for controlling automatically the alignment of a p-n junction of the semiconductor laser with respect to an external resonating cavity. The control means operates to maintain automatically the alignment of the resonating cavity components along the narrow dimension of the external surface of the junction, thereby maximizing the power of the coherent radiation.

22 Claims, 7 Drawing Figures

HIGH RADIANCE SEMICONDUCTOR LASER

The invention described herein was made in the performance of work under a NASA Contract and is subject to the provisions of Section 305 of the National Aeronautics and Space Act of 1958, Public Law 85-568 (72 Stat. 435; 42 U.S.C. 2457).

BACKGROUND OF THE INVENTION

1. Field of the Invention

This invention relates to semiconductor lasers. More particularly, it relates to systems in which the laser operates within an external resonating cavity to obtain spatially coherent laser radiation.

2. Description of the Prior Art

The development of a semiconductor laser which is capable of a high radiance output has been pursued since the first semiconductor lasers were discovered. There is an acute need for a device which will provide an intense, spatially coherent output for application in communications, optical navigation, range-finding, and other areas.

Radiance of a laser, in general form, is defined as the optical power per aperture area, per far-field beam solid angle. For high radiance, the radiated power should be large, but also the radiation should be in the lowest order transverse mode.

High radiance GaAs lasers have been built where the resonant structure is formed by the reflective ends of the laser diode, but their radiation is in a multitude of transverse modes with an arbitrary phase distribution. In an optical navigation system where the laser beam is recollimated to form a very narrow beam, the radiation must be in a single transverse mode to assure phase uniformity. An imposing number of coherent sources of solid-state ion, liquid, gaseous and semiconductor junction types have already been demonstrated. However, the nature of the junction laser, its high efficiency and the ease of modulating the laser radiation by modulating the injection current have made it superior in many ways to the other types of lasers.

The typical junction laser comprises a rectangular parallelepiped of semiconductor material, such as GaAs. One region of the material is doped with p-type impurities, the other region with n-type impurities, thereby forming at the interface of the regions a planar p-n junction which is substantially parallel to two of the surfaces of the parallelepiped. The p-n junction region of a high power GaAs laser is quite asymmetrical, it is comparatively long and wide but very small in height. By comparison with other types of lasing systems, semiconductor junction lasers are extremely small. The very high population inversion obtainable in semiconductors results in a large gain, so large in fact that the path length for stimulated radiation need be only a few hundred microns. These devices usually have a resonant structure of about 400 microns terminated by the cleaved surfaces of the laser itself which act as partial reflectors. The width of the cavity varies from a few microns to several hundred microns, the non-radiating sides being terminated by roughened surfaces or by non-pumped, absorbing semiconducting material. The cavity boundaries perpendicular to the current flow are formed by complex index of refraction and band gap changes that guide the optical waves and confine it to a region a few microns thick near the p-n junction. In addition to their small size, these diodes have become quite inexpensive to manufacture and are very reliable because of the tremendous improvements in the semiconductor industry during the past decade.

The principal disadvantage of these semiconductor lasers is that the output radiation is relatively incoherent compared to that obtainable from the other types of lasers. The radiation is composed of a multitude of transverse modes with an arbitrary phase distribution. As a result, these conventional semiconductor injection lasers radiate into a solid angle considerably larger than the theoretical limit set by diffraction; consequently, the radiance is lower than that obtainable from a perfectly spatially-coherent source. The beam divergence is approximately 20° in the directions both perpendicular and the parallel to the junction. The beam spread perpendicular to the junction is approximately diffraction-limited for a source which is only a few microns high. However, in the direction parallel to the junction, the beam spread may be as much as 100 times the diffraction limit because the short, wide cavity will sustain a large number of transverse modes.

Researchers in this field have proposed a number of solutions to this problem. For example, a diffractionlimited output has been obtained from very small injection lasers; however, the power output is small. Another technique used with some success is the use of a diode structure with angular surfaces which cause total internal reflection of light in one direction and the emission of a directional beam of coherent light in the opposite direction in the plane of the p-n junction. See, for example, the publication of Garfinkel et al. in the August, 1964, issue of the Journal of Applied Physics, pp 2321-23. In practice, these devices are extremely difficult to fabricate reliably due to their complexity; and their characteristics vary from laser to laser.

A meaningful advance in obtaining coherent, high brightness radiation from injection lasers occurred when a GaAs laser was operated in an external resonator with the laser surfaces AR coated. The theoretical and practical advantages of using an external cavity are discussed in an article by Rutz and Edmonds entitled "Diffraction Limited GaAs Laser with External Resonator" in Applied Optics, September, 1969, p. 1859. It was reported that the radiance of the output beam was an order of magnitude greater than systems not using an external cavity and that the measured radiation was for the most part in the $TEM_{00}$ mode. Output radiation of up to 2 watts peak power at room temperature was achieved.

Notwithstanding the noteworthy improvement over prior systems, the Rutz and Edmonds system suffers from two principal defects. First, the output contains a significant amount of radiation of the $TEM_{01}$ and $TEM_{02}$ modes as well as the desired $TEM_{00}$ mode. Second, the system does not operate satisfactorily in ambient or hostile environments, even though its operation under controlled conditions is quite satisfactory. The first problem has been cured by means of an aperture-limiting slit disposed within the resonator to extinguish all but the $TEM_{00}$ mode. The use of an aperture-limiting slit for this purpose has been suggested in the scientific literature and, although it is required in our system, we do not claim this as our invention.

The second problem has been traced to the misalignment of the external resonator elements with respect to the junction laser. Perfect alignment is critical. It is difficult to achieve and even more difficult to maintain over an extended period outside a laboratory. Prior to the present invention, it had been suggested that shock-mounting the system to preclude relative motion among the components would be successful. Another suggestion was to improve the functional design of the components themselves, a formidable task when dealing with microminiature components. Neither of these suggestions proved fruitful.

SUMMARY OF THE INVENTION

It is therefore an object of this invention to achieve high-brightness, diffraction-limited output radiation from a semiconductor laser operating in an external resonator.

It is a further object of this invention to obtain this radiation under operating conditions in a compact and rugged laser system.

These and other objects are achieved in a self-aligning semiconductor laser system in which the components of the external resonating cavity are movable in controlled fashion along the narrow dimension of the external surface of the p-n junction.

In one preferred embodiment of the invention, a GaAs injection laser with its surface AR coated is disposed within an external resonant cavity which comprises two sets of elements closely coupled to the radiating surfaces of the diode. Each set of cavity elements is controlled by separate piezoelectric transducers for movement along the narrow dimension of the p-n junction. Leakage radiation from the system energizes a closed-loop control circuit which operates the transducers to realign the cavity elements when a decrease of radiation is detected. Acquisition means are also provided to realign the system if shock or vibration causes a complete loss of radiation.

In another embodiment of the invention the laser is coated with a reflective coating on one side so that only a single set of cavity elements is required; and a single transducer maintains the alignment of the resonator with the junction.

Significantly, it has been found that after the initial precise alignment, which is made during the fabrication of the system, the alignment during the operation of the system need be controlled only along the narrow dimension of the p-n junction. It has been found that the tolerances of state-of-the-art systems are such that the movements of the components along the optical path of the radiation or along the long dimension of the p-n junction are not critical factors in achieving a stable output. Thus, under practical operating conditions, the movement of the external cavity means need be controlled only along the narrow dimension of the junction.

DESCRIPTION OF THE PREFERRED EMBODIMENT

Figure 1:
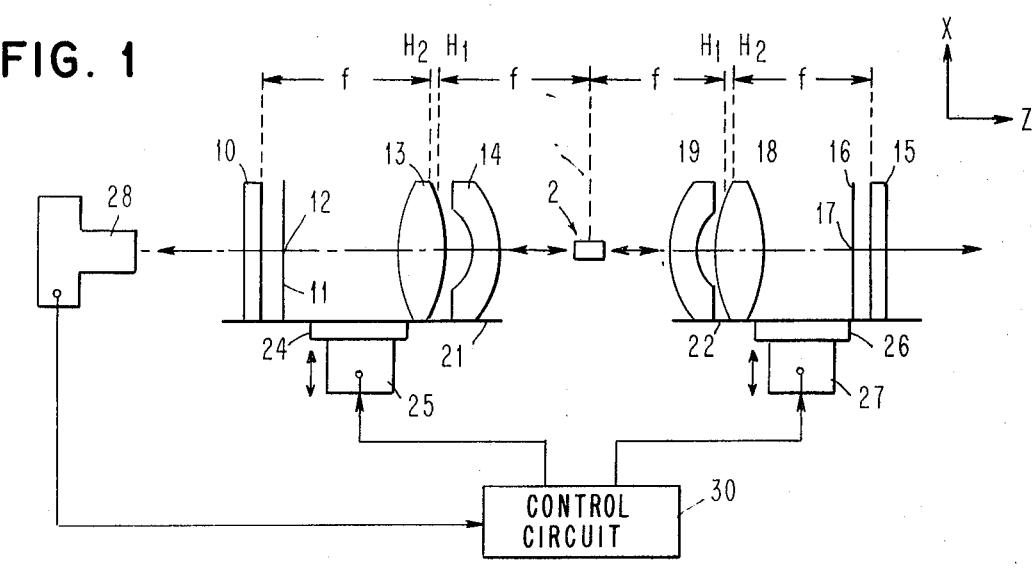
FIG. 1 is a schematic block diagram of one embodiment of the present invention.

Referring now to FIG. 1, a semiconductor laser 2 with its radiating surfaces anti-reflection (AR) coated is disposed within an external resonant cavity, each side of the resonator comprising spherical lenses and a plane reflector for establishing a self-reproducing field for the radiation from the p-n junction laser. Aperture-limiting slits disposed between the lenses and the reflectors provide means for confining the output radiation to the lowest order transverse mode ($TEM_{00}$).

One side of the resonant cavity comprises a reflector 10, an opaque panel or disc 11 containing an aperture-limiting slit 12, and a set of spherical lenses 13 and 14 corrected for spherical aberrations. Similarly, the other side of the resonant cavity comprises a reflector 15, an opaque panel or disc 16 containing an aperture-limiting slit 17 and a set of spherical lenses 18 and 19. The resonator elements on each side of the cavity are mounted on platforms 21 and 22, respectively.

As shown in the figure, the center of the diode is located at one focal length from a principal plane H1 of the lenses; and the plane reflectors are disposed on the opposite sides of the lasers at one focal length from the other principal plane H2 of the lenses. In this embodiment, the two opposite facing surfaces of laser 2 which face the cavity elements are cleaved and coated with an anti-reflection dielectric film for efficient operation of the p-n junction laser inside the optical cavity. The other surfaces are roughened or coated with an inactive material to inhibit radiation therefrom. The output radiation from the system is transmitted through reflector 15 which may have a reflectivity between 0.1 and 0.2. In the preferred embodiment, the reflectivity of reflector 15 is around 0.2. Reflector 10 is substantially totally reflective, i.e., around 99 percent.

A very small portion of the radiation generated within the system is transmitted through reflector 10 to photodetector 28. The current generated by the photodetector proportional to the optical power is amplified and fed to a control circuit 30 which drives piezoelectric crystals 25 and 27 in the vertical direction, i.e., along the narrow dimension of the p-n junction. The piezoelectric crystals are electromechanical transducers. The voltages from the control circuit result in an expansion or contraction of the piezoelectric crystals which, in turn, move platforms 21 and 22 which are fixedly mounted on members 24 and 26, respectively. As will be described in a succeeding section of this specification, the amount of radiation generated by the laser system is used to control the deflection of transducers 25 and 27 in a very precise manner, thereby maintaining the elements of the external resonator in alignment with the p-n junction of laser 2. For the sake of simplicity in the drawing, the electrode connections and driving source for injecting current into the p-n junction are not shown in the figures. These connections form no part of this invention and their design is obvious to those of skill in the art. Furthermore, this invention is not limited to injection lasers; for example, lasers in which the output radiation is generated by an optical input are also within the scope of this invention.

Figure 2:
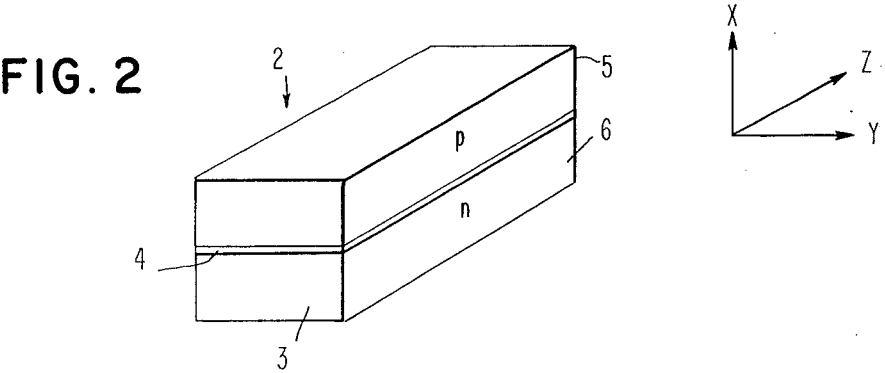
FIG. 2 is a perspective view of a typical laser diode used in the system illustrated in FIG. 1.

Referring now to FIGS. 2, the laser 2 is shown in perspective. The coordinate lines, X-Y-Z, correspond to the coordinates illustrated in FIG. 1. The dimensions of diode 2 are typically 2 × 200 × 400 microns in the X, Y, and Z directions, respectively. Radiation occurs from the junctions on surfaces 3 and 5 only, the other surfaces, such as surface 6, being coated with an inactive material or roughened to prevent radiation from the junctions at these surfaces. Surfaces 3 and 5 which face the external resonator are cleaved to obtain an equal optical pathlength for the coherent beam through the p-n junction laser. Surfaces 3 and 5 are also antireflection coated to inhibit laser action internal to diode 2.

The narrow dimension of p-n junction 4, i.e., in the X direction, is approximately 2 microns. Thus, the junction is quite asymmetrical, having an area of 2 × 200 microns on surfaces 3 and 5 which are coupled to the external resonator.

Returning now to FIG. 1, the theory of an external resonator comprising focusing lens means and a plane reflector closely coupled to opposite surfaces of a laser diode has been treated previously in the above-referenced article by Rutz and Edmonds.

In the present resonator, each set of elements performs the same operation in principle as described in the article. For example, along the narrow dimension of the p-n junction, i.e., the X direction, lens 13 and correcting lens 14 transform the diverging wavefront of the diode radiation to a plane wavefront at the plane reflector 10. The reflected wavefront is transformed into a circular wavefront which converges toward diode 2, located at the focal plane of the lenses. The same function is performed by lenses 18 and 19. Both sets of resonator elements thereby establish a self-reproducing field in the X direction. A similar analysis for radiation along the wide dimension of the p-n junction, i.e., the Y direction, yields the same result.

As compared to the single lenses illustrated in the Rutz and Edmonds article, however, the present lenses are corrected doublets which serve to reduce spherical aberrations. It has been found that the use of uncorrected lenses causes an additional loss mechanism to be introduced which is primarily a quadratic phase error over the wavefront emitted by the diode. This error excludes a part of the wide-angle radiation emitted from the narrow dimension of the p-n junction and prevents the establishment of a self-consistent field pattern for the wide-angle radiation. The corrected lenses are doublets with conjugate values of the third order aberration and are partly corrected for the fifty-order aberration. Those interested in a further discussion of the principles of the lens-plane reflector resonator should refer to the article by Rutz and Edmonds, in particular pages 1859-1861.

It might occur to one having skill in the laser field that each set of lens-plane reflector elements could be replaced by a concave reflector. This is possible but results in a less satisfactory output. In a resonator with concave mirrors, the $TEM_{00}$ mode beam radium at the cavity center is a function of the radium of the mirror. Because the active region of the diode must be retangular i.e., much wider than length, to obtain high power, each mirror would require a different curvature in the X and Y directions. At the present time, the fabrication of miniature mirrors satisfying these requirements is time-consuming and exorbitantly expensive.

On the other hand, in a resonator comprising spherical lenses and plane reflectors, where the injection laser and the plane reflectors are placed at the two focal planes of the lenses, the mode width and height are not determined by the resonator parameters. Due to this symmetry of the resonator along the optical axis, a plane wavefront at the resonator center is transformed into a plane wavefront at the reflectors. Only the product of the radii of the fundamental mode $w_0$ at the center of the cavity and $w_1$ at the reflectors is related to the focal length of the lenses. The mode radius $w_0$ itself is independent of the resonator parameters; consequently, in a laser with this type of optical cavity, the cross-section of the self-reproducing field pattern at the resonator center will coincide with the width and height of the active region of the laser diode. Although the optical cavity is symmetrical about the optical axis, the beam expansion from the p-n junction to the lenses in the direction along the junction is that of a near-confocal resonator; whereas in the direction perpendicular to the junction, the beam expansion is that of a near-concentric resonator.

The selection of the lowest order transverse mode $TEM_{00}$, along the p-n junction of diodes 2, i.e., in the Y direction, is performed by aperture-limiting slits 12 and 17. These slits are unnecessary when the injection current through the diode is close to the threshold current. However, when the injection current is raised to higher values, higher order transverse modes become superimposed on the $TEM_{00}$ mode. To discriminate against these higher order modes, the aperture-limiting slits are placed in front of the two plane reflectors to reduce the photon lifetime in all $TEM_{0N}$ modes, except the lowest order $TEM_{00}$ mode. In certain situations, it is possible to provide adequate mode selection with only a single aperture-limiting slit, say slit 11, and eliminating entirely the need for slit 16. However, the capability of a single aperture to control the $TEM_{00}$ mode appears to be limited at higher injection current by the gain saturation of the GaAs laser. In the GaAs laser, gain saturation occurs at relatively low power levels. It has been found that the $TEM_{00}$ mode may be controlled by a single aperture-limiting slit at reflector 10 only so long as the injection current is held below twice the threshold current. At higher injection currents where the spatial gain depletion appears to be more pronounced, a pair of symmetrical lobes appear in the far-field pattern of the radiation which are not related to the maxima of higher order transverse modes. These lobes can be eliminated, however, by using the aperture-limiting slit 16 which is slightly wider in the Y direction than slit 11.

In the preferred embodiment of the invention, where the p-n junction of diode 2 measures 200 × 2 microns in the Y and X dimensions, respectively, the focal length of the lenses is 1 cm. The size of slit 12 in panel 11 is 120 × 5000 microns for the Y and X dimensions, respectively; and the size of slit 17 in panel 16 is 150 × 5000 microns for the Y and X directions, respectively. It will be recognized by those of skill in this art that the selection of the length of the slit in the X direction is relatively unimportant as compared to the Y direction because the slits control the transverse modes in the Y direction only.

Control System Design

As noted in a previous section of this specification, the alignment of the laser with the optical cavity is critical in order to provide a close coupling between the active region of the laser and the cavity. In the cavity, the optical axis is established by the lens centers. To set up a self-reproducing field pattern in which the mode cross-section coincides with the active region of the injection laser, the center of the laser has to be along the optical axis, with its cleaved ends perpendicular to the axis and the plane reflectors have to be perpendicular to the optical axis. Some measure of variation can be tolerated in that the lenses may be rotated by a small angle and there may be a small displacement along the optical axis of the lenses relative to the cleaved end of the diode. The displacement must be less than:

$$W_{ox}^2 \times \pi/\lambda o \quad (1)$$

where $2w_{ox}$ is the height of the active region in the X direction and $\lambda o$ is the free space wavelength of the $TEM_{00}$ mode output radiation. It has been found that the system can be made sufficiently rigid to maintain the lens-diode alignment along the wide dimension of the diode, i.e., in the Y direction as well as in the Z direction. However, alignment along the narrow dimension, i.e., in the X direction, to an accuracy of $\pm 1$ micron, as required, cannot be maintained during practical operation. For maintaining the alignment during operation of the laser, a closed-loop control circuit energized by leakage radiation from the laser cavity operates two transducers which move the cavity elements along the narrow dimension of the diode to maximize the output power. In case the misalignment of one or both sides of the optical resonator exceeds ±4 microns, the laser radiation cannot be set-up any longer. The alignment of the laser is then performed during the "acquisition" mode. Continuation alignment during operation is performed in the "maximizing" and "tracking" modes.

Figure 3:
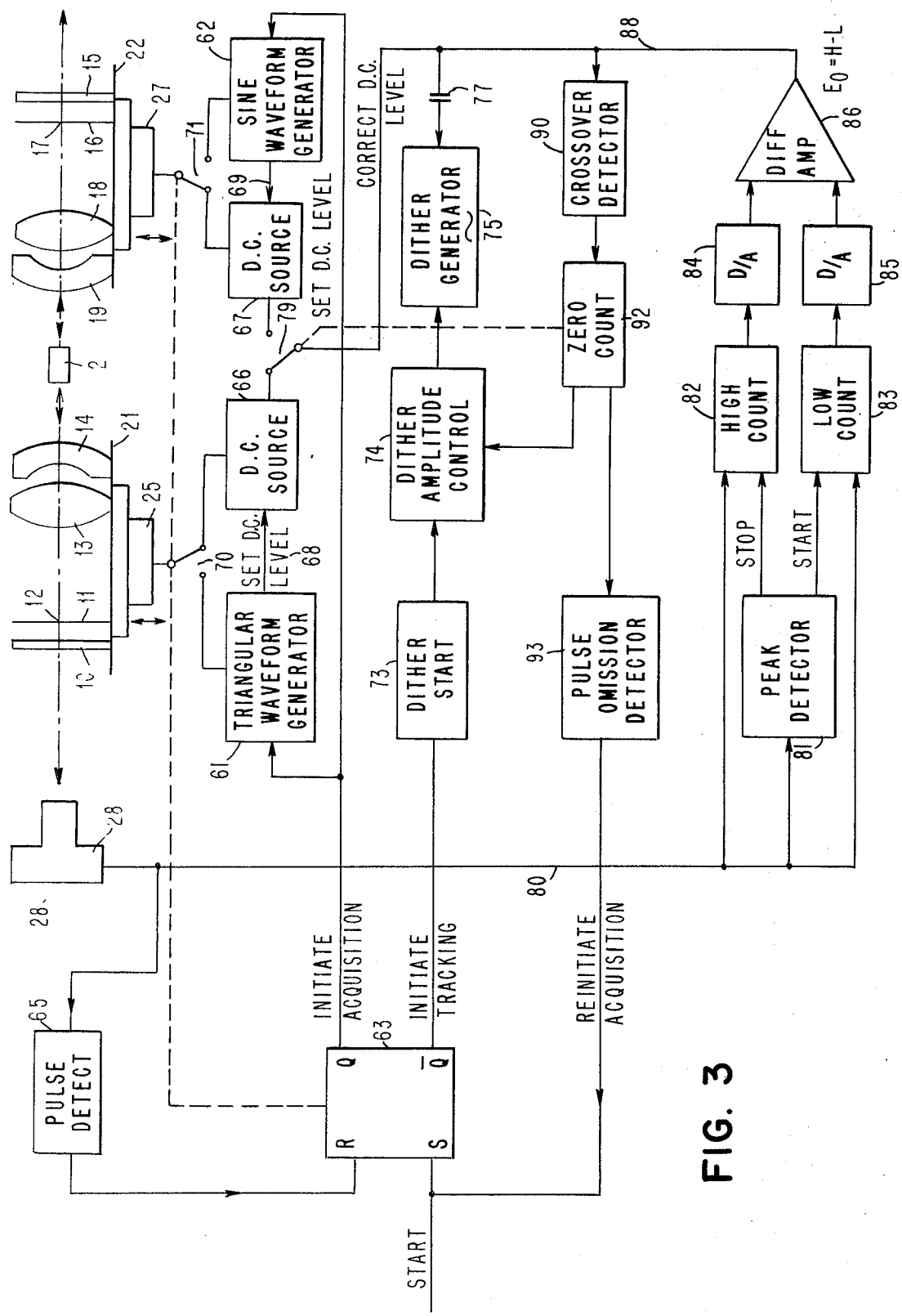
FIG. 3 is a detailed schematic of a control circuit illustrated in FIG. 1.

An embodiment of the control circuit 30 in FIG. 1 is described in more detail in the schematic diagram shown in FIG. 3. In FIG. 1, the diode is disposed between two sets of external cavity resonator elements mounted on platforms 21 and 22, and both sides must be aligned to achieve maximum laser output.

In the preferred embodiment of this invention, the cavity elements must be aligned precisely with the 2 microns wide narrow dimension of the p-n junction to within 0.5 micron. A displacement of either set of elements by ±4 microns from the optical axis will extinguish laser radiation. Displacements of up to ±15 microns are possible in an operating system due to shock and vibration.

Referring now to FIG. 3, each transducer is controlled by a varying waveform generator when the circuit is in the acquisition mode. Transducer 25 is controlled by triangular waveform generator 61; and transducer 27 is controlled by sine waveform generator 62. These generators are activated simultaneously by an INITIATE ACQUISITION command received from the Q output line of "flip-flop" 63. The flip-flop in turn is operated initially by a start pulse received on the SET INPUT line. Flip-flop 63 also operates switches 70 and 71 to connect transducers 25 and 27 to the waveform generators.

In the acquisition mode, transducer 25 is slowly expanded and contracted (scanned) from one extreme to another at a much higher rate by a signal from sine waveform generator 62. This sweeping process is repeated until laser pulses are generated and observed through reflector 10. These pulses are detected by photomultiplier tube 28, the output of which is detected by a pulse counter 65. After a selected number of pulses are received in the pulse counter, say four, an output from the pulse counter to the R input resets flip-flop 63 and initiates the tracking mode, the operation of the flip-flop thereby terminating the acquisition mode. A more detailed consideration of the operation of the acquisition circuitry will be described in a succeeding section of this specification.

At the termination of the acquisition mode, both waveform generators stop scanning and hold. The DC levels on each waveform which displaced the transducers sufficiently to cause an initial output from the laser are now established. These DC biases are applied via a SET DC LEVEL signal to DC source circuits 66 and 67 by triangular waveform generator 61 and sine waveform generator 62, respectively. Switches 70 and 71 are then connected to sources 66 and 67, respectively, under control of flip-flop 63, thereby setting transducers 25 and 27 in the positions in which the laser pulses were detected.

The INITIATE TRACKING signal from the $\overline{Q}$ output line of flip-flop 63 initiates a dithering signal by means of dither state circuit 73 which activates dither generator 75 through a dither amplitude control circuit 74. As is well known to those of skill in this art, a dithering signal is merely a small amplitude, low frequency sinusoid which is imposed on a substantially constant DC level signal. The signal from dither generator 75 is superimposed on the DC sources 66 and 67 in alternate fashion through a blocking capacitor 77 and switch 79 which is controlled by zero count circuit 92. Assuming that the switch 79 is first connected to DC source 66, the dither signal operates to cause transducer 25 to expand and contract about its set position. The purpose is to generate a series of laser pulses having varying energy content which may be detected and used to generate an error signal $\epsilon o$. Through half a period of the dither signal, the mechanical motion of the transducer is such that it effectively decreases the misalignment, rather than increases and thus increases the laser optical power. The laser pulses are detected by photomultiplier 28. Electrical pulses representative of the laser pulses are transmitted via line 80 to a peak detector 81 and to high count and low count circuits 82 and 83.

Assuming that the dither signal increases the DC level to raise transducer 25 initially above its set position, rather than below, the first series of pulses are counted in high count circuit 82. Peak detector 81 serves to integrate these pulses until a maximum energy level is reached, indicating the optimum positioning of transducer 25. Detector 81 then turns counter 82 off by means of the STOP signal and activates counter 83 by means of the START signal. The transducer passes through its optimum position under the influence of the dither waveform. The output pulses continue to be generated but at decreasing amplitudes. These pulses are counted by counter 83. The pulses from high count and low count circuits 82 and 83 are fed to digital-to-analog (D/A) converters 84 and 85, respectively. The analog outputs from the converters are compared in a differential amplifier 86 which generates an error signal, $\epsilon o$, which is an indication of the difference in the number of pulses generated from the laser cavity when transducer 25 is above and below the set position established in the acquisition mode. Thus $\epsilon o$ is an electrical representation of the distance and direction in which transducer 25 must be moved to attain an optimum position. Error signal $\epsilon_0$ is fed via line 88 to crossover detector 90 and also to the DC source 66 via switch 79. The error signal operates to correct the level of the DC source 66.

A zero error signal is generated whenever the number of pulses (equivalent to the average laser energy content) on either side of the peak is equal, thereby indicating that the cavity elements controlled by transducer 25 have been driven on or very near correct alignment with the p-n junction. At this point the crossover detector 90 activates the zero count circuit 92 to cause switch 79 to switch to the DC source 67 where the dither operation previously described for transducer 25 is repeated for transducer 27. The crossover detector 90 also operates to activate the zero count circuit whenever no pulse is detected from photodetector 28. In this event, pulse omission detector 93 is activated to reinitiate the acquisition mode by operating the S input of flip-flop 63.

Figure 4:
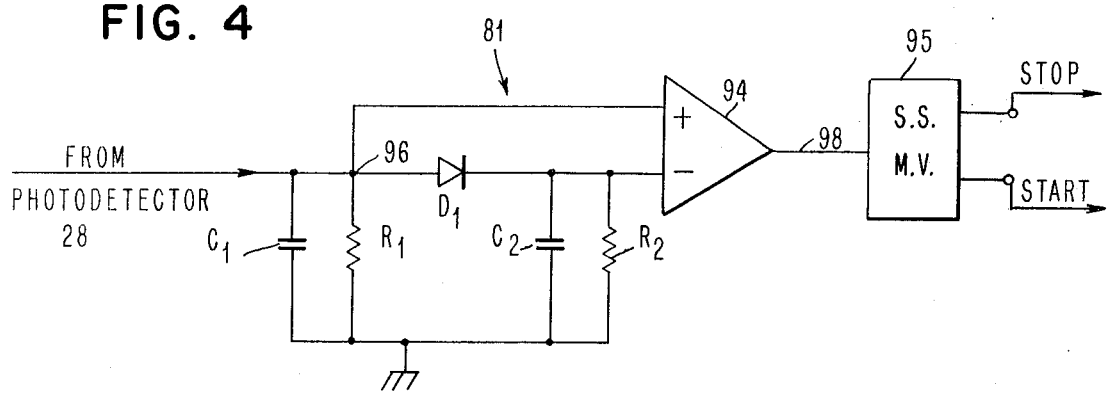
FIG. 4 is a circuit diagram of a peak detector used in the control circuit of FIG. 3.

FIG. 4 is a more detailed circuit diagram of the peak detector 81 illustrated in FIG. 3. The pulses received from photodetector 28 through connection 80 are integrated by the filter comprising capacitor C1 and resistor R1. It will be recalled from the foregoing description with respect to FIG. 3 that the pulses are simultaneously being counted either by high count circuit 82 or by low count circuit 83. The filtered signal at point 96 in the circuit is connected directly to the + input of comparator 94. It is also connected, through coupling diode D1 and the filter comprising capacitor C2 and resistor R2, to the − input of comparator 94. Thus, the signal on the − terminal of comparator 94 follows the signal on the + terminal until the signal at 96 reaches a peak. Up to this time no signal appears at the output 98 of the comparator since the potentials at the + and − inputs of comparator 94 are equal.

As the voltage at point 96 starts to fall off, thereby indicating that the resonator elements have passed through the point of optimum alignment with the p-n junction of the diode 2, coupling diode D1 is back biased due to the charge retained by capacitor C2, the value of $R_2C_2$ being greater than the value of $R_1C_1$. The signal at the + terminal of comparator 94 falls below the signal on the − terminal, thereby generating an output of 98. This signal operates the monostable multivibrator 95 to stop one of the count circuits 82 or 83 and to start the other, which then counts until no pulses are received from photodetector 28.

Operation in the Acquisition Mode

Figure 5:
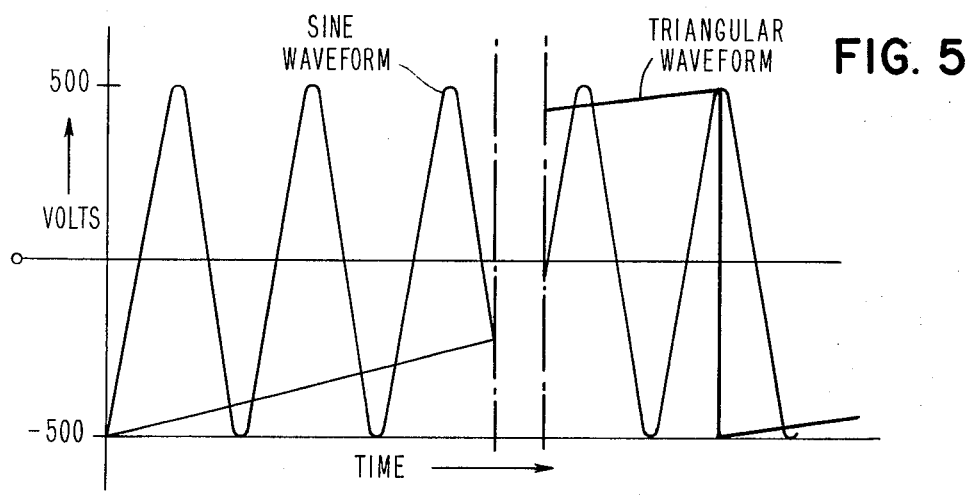
FIGS. 5 and 6 are graphs of waveforms illustrating the operation of the control circuit of FIG. 3.

FIG. 5 illustrates the waveforms generated by triangular waveform generator 61 and sine waveform generator 62 when the control circuit is operating in the acquisition mode. The requirements for the sine and triangular waveforms are typical for the embodiment discussed here. Piezoelectric ceramics are being used which expand and contract by ±15 microns when a voltage of ±500 volts is applied to the electrodes on the ceramics. The relationship between the dimensional change of the ceramic which causes the movement of the platforms 21 and 22 and the applied voltage is linear. As previously discussed the need to displace the platforms by ±15 microns about the 2 micron junction of laser 2 arises because it has been determined that displacements of up to 15 microns on either side of the junction can be expected due to vibration and shock.

With regard to FIG. 5, the sinusoidal waveform which drives transducer 27 has a higher frequency than the triangular waveform which drives transducer 25. Thus, platform 22 is scanned from one extreme of its position to the other in the X direction at a much higher rate than is platform 21. The sinusoidal waveform is used for this faster motion because it does not cause abrupt changes in direction of the mechanically loaded piezoelectric ceramic.

The frequency and duration of the sine and triangular waveforms are dependent upon the frequency of the injection current pulses driving diode 2. Assuming that the laser generates pulses at a 1 KHz rate with approximately 75 ns duration, then one laser pulse will be generated every millisecond. Tests have shown that coherent radiation can be detected as long as the external resonator cavity is aligned within ± 4 microns.

Operation in the Maximizing Mode

At the instant the desired acquisition pulse is generated from pulse counter 65, flip-flop 63 resets and terminates the acquisition mode. Signals from the triangular waveform generator 61 and sine waveform generator 62 set the DC levels of DC sources 66 and 67 through connections 68 and 69, respectively. A DC voltage equal to the instantaneous value of the waveform voltages at which the laser will begin to generate coherent radiation are applied to transducers 25 and 27. Thus, at this point the physical length of the transducers is proportional to the applied voltages. The transducers now maintain platforms 21 and 22 in a set position where the optical cavity is aligned in reference to the p-n junction laser diode 2 and pulses of coherent radiation will be generated in the laser and transmitted through reflector 15. In general, pulses emitted at this point will not have the maximum energy content of which the laser system is capable because the p-n junction of the diode is not perfectly aligned with the resonantor cavity elements. To maximize the energy in the laser output pulses, means are provided to closely align the resonator axis with the p-n junction. The maximizing means operates first on one set of optical elements and then on the other set. The maximizing mode begins when an INITIATE TRACKING signal is generated by the $\overline{Q}$ output of flip-flop 63 to start dither generator 75. The dither generator emits a small amplitude, low frequency sinusoidal voltage which is superimposed in alternative fashion on the DC signal emitted by sources 66 and 67. In this fashion the platforms 21 and 22 are raised and lowered in very small amounts about the level set in the acquisition mode.

Figure 6:
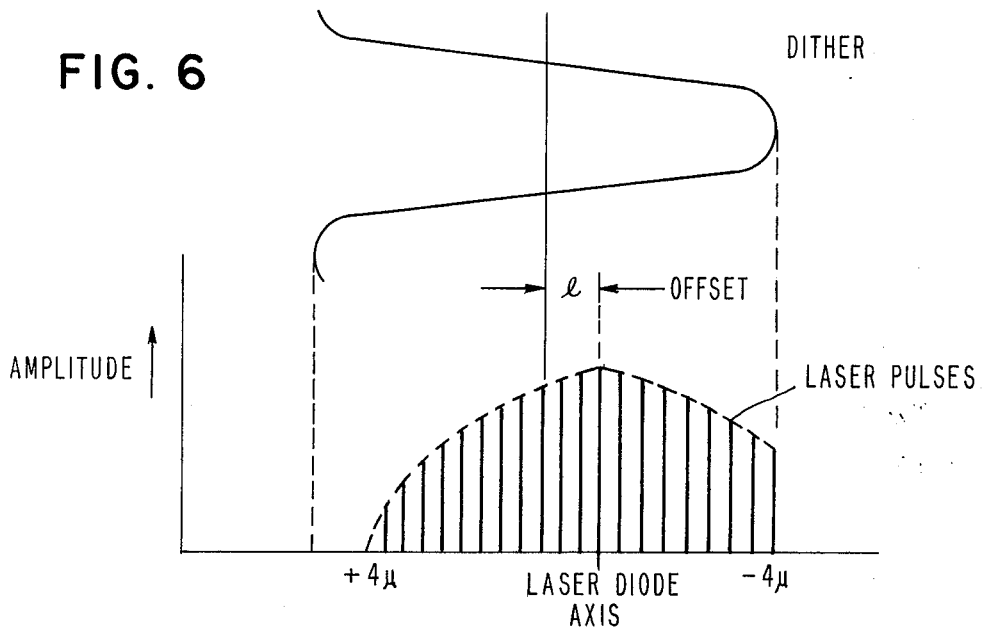

Assume for purposes of illustration that relay 79 initially connects the output from dither generator 75 to the DC source 66. This variation of voltage around the set DC level established previously by the triangular waveform generator is transmitted through switch 70 to the transducer 25 to move platform 21 about its fixed position. This mechanical motion varies periodically the resonator alignment such that the laser emits pulses which have varying energy content. The effect of the dithering signal on the resonator elements is illustrated in FIG. 6. It is assumed that the initial position of the resonator elements on platform 21 are offset from the laser diode axis by a distance '*l*' microns. The amplitude of the dither signal is in the order of ± 66 volts so that the mechanical motion of platform 21 is in the order to ± 2 microns. The frequency of the dithering signal is made low enough so that a good sampling rate is obtained. This, of course, depends on the rate of the injection current pulses applied to diode 2. As platform 21 is moved periodically about the set position, the output pulses generated from the laser system vary in energy content as a function of the distance of the resonator elements from the diode axis.

In FIG. 6 the resonator elements are initially above the diode axis by an offset distance of $l$ microns. Pulse counting begins in high count circuit 82 (FIG. 3) as platform 21 moves towards the diode axis. As the platform moves through the diode axis, the amplitude of the pulses becomes maximum, peak detector 81 stops the high count circuit and initiates low count circuit 83 to count pulses as the signal falls off until a pulse with minimum energy or no pulse is detected. The dithering then continues in the reverse direction. A comparison of the pulses counted by high count circuit 82 and low count circuit 83 indicates the offset distance depending on the number of pulses counted by the high or low circuit. In FIG. 6, 11 pulses are detected by photodetector 28 prior to the maximum pulse and 8 pulses detected after the maximum energy pulse has been detected. In this situation counter 82 would count 11 pulses and counter 83 would count 8 pulses. This information is passed to digital-to-analog converters 84 and 85, respectively, the outputs of which are compared in differential amplifier 86 which generates an error signal $\epsilon_0$. The error signal is a DC voltage which is applied through connection 88 and to DC source 66 to rest the level of DC source 66, thereby to accurately align the resonator components mounted on platform 21 in reference to the p-n junction. With the DC level now corrected, the next sweep of the platform should yield an equal number of pulses about the maximum energy pulse. In this case the error signal $\epsilon_0 = 0$ thereby indicating that the resonating components have been driven at or very near accurate alignment with the p-n junction. This zero error signal actuates cross-over detector 90 and zero count circuit 92 which switches relay 79 from DC source 66 to DC source 67. The circuit then operates in a similar fashion to establish the position of platform 22.

After the components of the resonator which are mounted on platform 22 have been positioned for maximum output, the maximizing mode may be terminated. Alternatively, switch 79 may switch back to the DC source to check the setting of platform 21. This terminates the maximizing mode.

Operation in the Tracking Mode

After the maximizing mode has been completed, zero count circuit 92 reduces the amplitude of the signal emitted by dither generator 75 by means of dither amplitude control circuit 74. In the preferred embodiment the dither signal is reduced to ± 15 volts, which corresponds to a displacement of ± 0.5 micron on the platforms 21 and 22. The switch 79 periodically switches the dither signal between the two transducers 25 and 27 for constant monitoring and tracking of the laser output. The control circuit is now in closed-loop operation and corrections are continuous and automatic. Should the laser signal be lost at any time, pulse omission detector 93 is actuated to re-initiate the acquisition mode. Alternatively, the dither amplitude control may reinitiate the large dither signal which was used in the maximizing mode.

Figure 7:
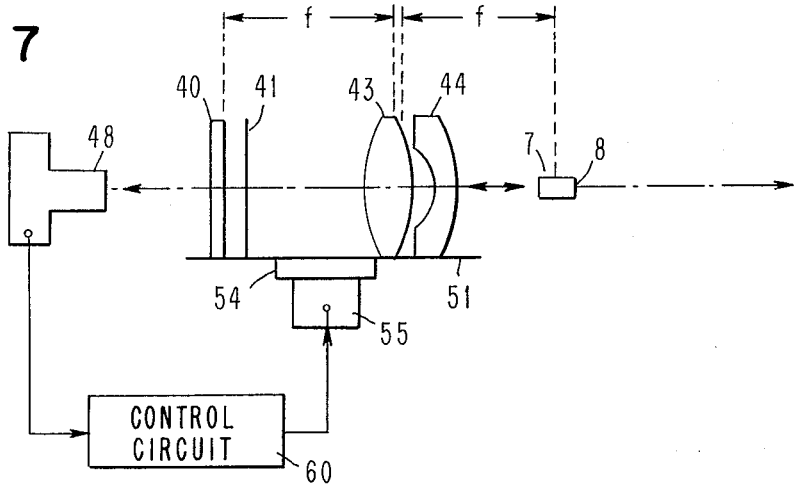
FIG. 7 is a schematic block diagram of another embodiment of the present invention.

FIG. 7 is an alternate embodiment of the laser system of this invention. Here the resonator functions effectively as a plane-concave cavity. The plane reflector is formed by side 8 of the diode which is not coated and which has a reflectivity of 0.3. Side 7 of the diode is anti-reflection coated, the external lens totally reflecting mirror combination functions similar to half of the resonator in FIG. 1. Control circuit 60 can be much simpler in design and operation than control circuit 30 (FIG. 1) because only a single resonator section need be aligned with the diode axis.

While the invention has been particularly shown and described with reference to a preferred embodiment thereof, it will be understood by those skilled in the art that various changes in form and detail may be made therein without departing from the spirit and scope of the invention. For instance, other circuits than the particular control circuit illustrated in FIG. 3 could be designed to perform its function. In addition, means other than a piezoelectric transducer could be used to convert the signal from the control circuit into translational movement. As previously pointed out, the invention is not limited to GaAs injection lasers. Other laser materials and means for activating them are within the scope of our invention.

What is claimed is:

1. A laser system providing a high radiance output comprising:
   a p-n junction semiconductor laser, the radiating surfaces of said junction being substantially narrower in one dimension than the other;
   resonant cavity means coupled to at least one of said radiating surfaces for establishing a self-reproducing field pattern for stimulated radiation emitted from said p-n junction;
   means disposed within said cavity for restricting the output radiation of said cavity to a single transverse mode emitted by the laser; and
   control means for maintaining said resonant cavity means in alignment with said junction along said narrow dimension of the junction;
   said control means comprising:
   means for sensing changes in the output from said resonant cavity; and
   means connected to said sensing means and responsive to an indication of changes in the cavity output for controllably displacing said cavity means and said mode restricting means along the narrow dimension of said p-n junction.

2. A system as in claim 1 wherein said sensing means is a photodetector and said controllable displacing means comprises:
   transducer means coupled to said cavity means; and
   control circuit means for energizing said transducer means in accordance with said indication from said sensing means.

3. A system as in claim 2 wherein said control circuit means comprises:
   acquisition means for aligning said cavity means and said p-n junction;
   means for maximizing the output radiation from the aligned laser system; and
   tracking means for maintaining the cavity means in alignment with said junction to maintain a maximum output radiation.

4. A system as in claim 1 wherein said semiconductor laser is an injection laser.

5. A system as in claim 4 wherein said laser is a gallium arsenide diode.

6. A system as in claim 1 wherein, for each radiating surface, said resonant cavity means comprises:
a plane reflector;
spherical lens means for focusing radiation emitted from said p-n junction onto said reflector and back into the p-n junction;
said reflector disposed at one focal length from said lens means; and
said laser disposed on the opposite side of said lens means from said reflector at one focal length from said lens means.

7. A system as in claim 6 wherein said mode restricting means comprises an aperture-limiting slit disposed adjacent one of said plane reflectors within the optical cavity.

8. A laser system providing a high radiance output comprising:
a p-n junction semiconductor laser, the radiating surfaces of said junction being substantially narrower in one dimension than the other;
first and second resonant cavity means coupled to said first and second opposite radiating surfaces, respectively, for establishing a self-reproducing field pattern for stimulated radiation emitted from said p-n junction;
means disposed within said cavity for restricting the output radiation of said cavity to a single transverse mode emitted by the laser; and
control means for maintaining each of said resonant cavity means in alignment with said junction along said narrow dimension of the junction;
said control means comprising:
means for sensing changes in the output from said resonant cavity; and
means connected to said sensing means and responsive to an indication of changes in the cavity output for controllably displacing said first and second cavity means and said mode restricting means along the narrow dimension of said p-n junction.

9. A system as in claim 8 wherein said sensing means is a photodetector and said displacing means comprises:
first and second piezoelectric transducers coupled to said first and second cavity means, respectively; and
control circuit means for energizing said transducers in accordance with said indication from said sensing means.

10. A system as in claim 9 wherein said control circuit means comprises:
acquisition means for aligning said first and second cavity means with said laser;
means for maximizing the output radiation from the aligned laser system; and
tracking means for maintaining said first and second cavity means in alignment with said junction to maintain a maximum output radiation.

11. A system as in claim 8 wherein said semiconductor laser is an injection laser.

12. A system as in claim 11 wherein said laser is a gallium arsenide diode.

13. A system as in claim 8 wherein each of said resonant cavity means comprises:
a plane reflector;
spherical lens means for focusing radiation emitted from said p-n junction onto said reflector and back into the p-n junction;
said reflector disposed at one focal length from said lens means; and
said laser disposed on the opposite side of said lens means from said reflector at one focal length from said lens means.

14. A system as in claim 13 wherein said mode restricting means comprises an aperture-limiting slit disposed adjacent a selected one of said plane reflectors within the optical cavity.

15. A system as in claim 13 wherein said mode restricting means comprises aperture-limiting slits disposed adjacent each of said plane reflectors within the optical cavity.

16. A laser system providing a high radiance output comprising:
a p-n junction semiconductor laser, the radiating surfaces of said junction being substantially narrower in one dimension than the other, one of said surfaces being reflective;
resonant cavity means coupled to a radiating surface opposite said reflective surface to form an optical cavity herewith for establishing a self-reproducing field pattern for stimulated radiation emitted from said p-n junction;
means disposed within said cavity for restricting the output radiation of said cavity to a single transverse mode emitted by the laser; and
control means for maintaining said resonant cavity means in alignment with said junction along said narrow dimension of the junction;
said control means comprising:
means for sensing changes in the output from said optical cavity; and
means connected to said sensing means and responsive to an indication of changes in the cavity output for controllably displacing said cavity means and said mode restricting means along the narrow dimension of said p-n junction.

17. A system as in claim 16 wherein said sensing means is a photodetector and said controllable displacing means comprises:
a piezoelectric transducer coupled to said resonant cavity means; and
a control circuit for energizing said transducer means in accordance with said indicating from said sensing means.

18. A system as in claim 17 wherein said control circuit means comprises:
acquisition means for aligning said resonant cavity means with said laser;
means for maximizing the output radiation from the aligned laser system; and
tracking means for maintaining said cavity means in alignment with said junction to maintain a maximum output radiation.

19. A system as in claim 16 wherein said semiconductor laser is an injection laser.

20. A system as in claim 19 wherein said laser is a gallium arsenide diode.

21. A system as in claim 16 wherein said resonant cavity means comprises:
a plane reflector;

spherical lens means for focusing radiation emitted from said diode onto said reflector and back into the p-n junction;

said reflector being disposed at substantially one focal length from said focusing means; and said diode being disposed at substantially one focal length from said lens and opposite from said reflector.

22. A system as in claim 21 wherein said mode restricting means comprises an aperture-limiting slit disposed adjacent said plane reflector within the optical cavity.

* * * * *